US008971598B2

(12) United States Patent
Lavi et al.

(10) Patent No.: US 8,971,598 B2
(45) Date of Patent: Mar. 3, 2015

(54) IMAGE VIEWING WINDOW

(75) Inventors: Guy Lavi, Avichail (IL); Jonathan Lessick, Haifa (IL)

(73) Assignee: Koninklijke Philips N.V., Eindhoven (NL)

( * ) Notice: Subject to any disclaimer, the term of this patent is extended or adjusted under 35 U.S.C. 154(b) by 1082 days.

(21) Appl. No.: 12/528,852

(22) PCT Filed: Feb. 13, 2008

(86) PCT No.: PCT/IB2008/050533
§ 371 (c)(1), (2), (4) Date: Aug. 27, 2009

(87) PCT Pub. No.: WO2008/104897
PCT Pub. Date: Sep. 4, 2008

(65) Prior Publication Data

US 2010/0104160 A1 Apr. 29, 2010

Related U.S. Application Data

(60) Provisional application No. 60/892,259, filed on Mar. 1, 2007.

(51) Int. Cl.
*G06K 9/00* (2006.01)
*G06T 19/00* (2011.01)

(52) U.S. Cl.
CPC ............ *G06T 19/00* (2013.01); *G06T 2210/41* (2013.01)
USPC .......................................... 382/128; 382/131

(58) Field of Classification Search
CPC .................. G06T 7/0012; G06T 2207/10081; G06T 19/00; G06T 2210/41; A61B 19/5244; G06F 19/321
USPC .................................... 382/131; 378/62, 210
See application file for complete search history.

(56) References Cited

U.S. PATENT DOCUMENTS

| | | | | |
|---|---|---|---|---|
| 6,324,243 | B1 | 11/2001 | Edic et al. | |
| 2003/0095697 | A1 | 5/2003 | Wood et al. | |
| 2004/0114727 | A1* | 6/2004 | Yan et al. | 378/210 |
| 2006/0058624 | A1 | 3/2006 | Kimura | |
| 2006/0277073 | A1* | 12/2006 | Heilbrunn et al. | 705/3 |
| 2007/0237295 | A1* | 10/2007 | Gundel | 378/62 |

(Continued)

FOREIGN PATENT DOCUMENTS

| | | | |
|---|---|---|---|
| EP | 0544509 | A2 | 6/1993 |
| EP | 0635808 | A2 | 1/1995 |

(Continued)

OTHER PUBLICATIONS

Cignoni, P., et al.; MagicSphere: an insight tool for 3D data visualization; 1994; Eurographics; 13(3)317-328.

(Continued)

*Primary Examiner* — Luke Gilligan

(57) ABSTRACT

A method for visualizing a region of interest within a viewport includes presenting tomographic image data as an image in a viewport using a set of global image processing operations, presenting a viewing window in the main viewport; and using a second, different set of image processing operations that is local to the viewing window, wherein the second, different set of image processing operations reduces image artifact with respect to a desired structure of interest in the viewing window.

26 Claims, 3 Drawing Sheets

(56) References Cited

U.S. PATENT DOCUMENTS

| | | | | |
|---|---|---|---|---|
| 2008/0137935 | A1* | 6/2008 | Spahn | 382/132 |
| 2008/0219532 | A1* | 9/2008 | Hopkins et al. | 382/131 |

FOREIGN PATENT DOCUMENTS

| | | | |
|---|---|---|---|
| EP | 0638874 | A1 | 2/1995 |
| EP | 1063617 | A1 | 12/2000 |
| JP | 2002017685 | A * | 1/2002 |
| WO | 0242998 | A2 | 5/2002 |

OTHER PUBLICATIONS

Hastreiter, P., et al.; Strategies for brain shift evaluation; 2004; Medical Image Analysis; 8:447-464.

Taerum, T., et al.; Real-Time Super Resolution Contextual Close-up of Clinical Volumetric Data; 2006; Eurographics; online; pp. 3347-354.

Mun, S. K., et al.; Image Management and Communications (IMAC) System Tutorial; 1993; IEEE Trans. of 3rd Int'l. Conf. on Image Management and Communication in Patient Care; pp. 6-19.

* cited by examiner

IMAGE VIEWING WINDOW

CROSS REFERENCE TO RELATED APPLICATIONS

This application claims the benefit of U.S. provisional application Ser. No. 60/892,259 filed Mar. 1, 2007, which is incorporated herein by reference.

The present application generally relates to image processing. While it finds particular application to computed tomography (CT), it also relates to other medical and non-medical imaging applications.

The dynamic range of computed tomography (CT) image data has included Hounsfield units or CT numbers from about +3000 for bone to about −1000 for lung tissue. Representing this range with a gray scale would require about 4000 gray levels, if a different shade of gray is assigned to each CT number. However, CT systems have included 8-bit monitors that display a maximum of 256 (or $2^8$) gray levels, and the human eye resolves about 35 gray levels.

Using too many or too few gray levels may compromise contrast resolution and hence the ability to differentiate between structures or tissue. Contrast resolution for a particular structure of interest has been improved by choosing a window width (the number of gray levels or CT Numbers displayed) that is larger than the image white noise and a window level such that a CT number corresponding to the structure of interest lies within the window width.

When using such a window, data having CT numbers outside of the window often are assigned the maximum or minimum value of the width range, depending on whether the CT number is greater than the maximum CT number of the window or less than the minimum CT number of the window. As a consequence, structures with CT numbers outside of the window may be blurred or invisible to a viewer.

In order to visualize data outside of the window, a user can change the window level. This approach can become problematic when a viewer wishes to concurrently view structures that necessitate different window levels for a given window width in order to view the structures at a desired contrast resolution. For example, this approach is not well-suited when the viewer desires to view a structure having a relatively high CT number such as bone, vessels with contrast in them, or calcium deposits simultaneously with a structure having a relatively low CT number such as lung, fat, or soft tissue. In such case, the user can toggle between window settings to alternately view the higher CT number structure or the lower CT number structure with desired window settings. Unfortunately, this may become tedious, and the user is not able to concurrently view the structures with the desired window settings.

Furthermore, viewing some structures with sub-optimal window settings may introduce artifact. For instance, the presence of highly contrasted structures in relatively close proximity to each other may cause a partial volume effect near the border zone. The partial volume effect has been sensitive to window level and width settings. As a consequence, using sub-optimal window settings can lead to blooming of the highly contrasted structure, which may result in a structure appearing larger than its relative true size. The window settings can be changed to reduce such artifact, however, highly contrasted structures are often small relative to the rest of the image, and changing window settings of the entire image to mitigate blooming may be sub-optimal for viewing the other regions of the image.

Aspects of the present application address the above-referenced matters and others.

According to one aspect, a method for visualizing a region of interest within a viewport includes presenting tomographic image data as an image in a viewport using a set of global image processing operations, presenting a viewing window in the main viewport; and using a second, different set of image processing operations that is local to the viewing window, wherein the second, different set of image processing operations reduces image artifact with respect to a desired structure of interest in the viewing window.

According to another aspect, a computer readable storage medium includes instructions that when executed by a computer carry out the steps of presenting an image in a viewport using a first set of image processing operations, overlaying a viewing portal over a sub-region of the image in the viewport, and applying a second set of image processing operations to the sub-region in the viewing portal, wherein the second set of image processing operations enhance image quality of a structure of interest viewable in the portal relative to other structures in the portal.

According to another aspect, an apparatus includes an image generator that processes a signal indicative of radiation emitted by a radiation source that traverse an examination region signal and presents an image indicative of the examination region on a monitor and an image enhancer that generates a viewing portal over a sub-region of the image and applies local viewing parameters to the viewing portal, wherein the local viewing parameters correspond to a structure of interest in the viewing portal.

Still further aspects of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
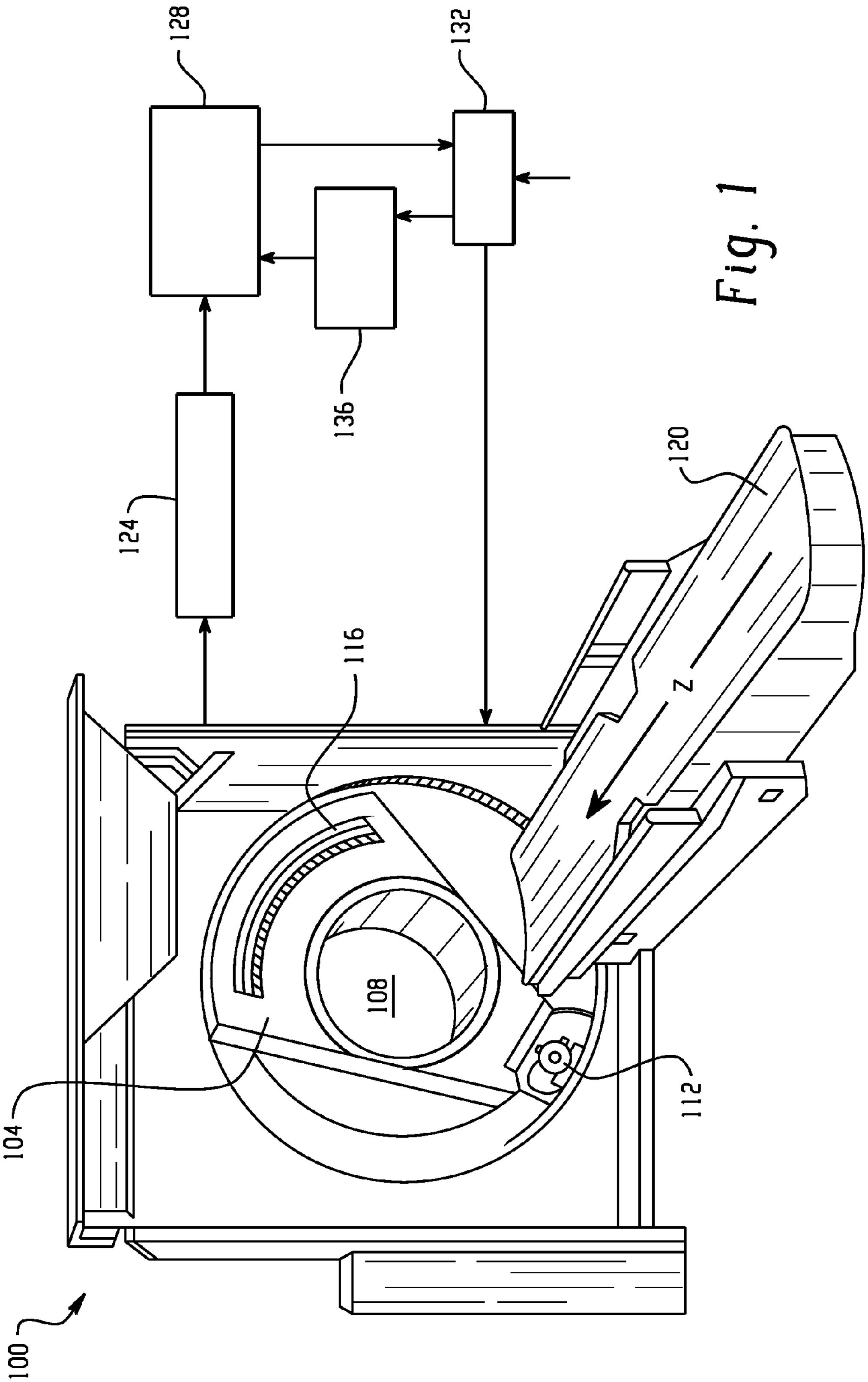
FIG. 1 illustrates an imaging system having an image enhancer that provides an image viewing window.

With reference to FIG. 1, a computed tomography (CT) scanner 100 includes a rotating gantry portion 104 that rotates about an examination region 108 around a longitudinal or z-axis.

The rotating gantry portion 104 supports an x-ray source 112, such as an x-ray tube, that generates and radiates x-rays that traverses the examination region 108.

The rotating gantry portion 104 also supports an x-ray detector 116 that detects x-rays radiated by the source 112 that traverses the examination region 108. The x-ray detector 116 generates x-ray projection data indicative of the detected x-rays for a plurality of projection angles with respect to the examination region 108 over one or more revolutions around the examination region 108.

An object support 120 such as a couch supports a patient or other object in the examination region 108. The object support 120 is movable so as to guide the patient or other subject within respect to the examination region 118 while performing a scanning procedure.

A reconstructor 124 reconstructs the x-ray projection data to generate volumetric image data. The volumetric image data is indicative of the examination region 108.

An image rendering engine 128 processes the image data and presents the processed data in a human readable format on a monitor or the like.

A general purpose computer serves as an operator console 132. The console 132 includes an input interface for receiving an input signal from an input device such as a keyboard or mouse. The console 132 further includes an output interface, such as a monitor, for presenting the processed data as an image in a viewport. Software resident on the console 132 controls the scanner 100.

An image enhancer 136 visually enhances a sub-region of the image presented in the viewport. The image enhancer 136 is invoked by the console 132, for example, in response to a user input that indicates a desires to enhance a sub-region of the image. In one instance, the input may include an instruction for generating a user moveable viewing window for the viewport. The image rendering engine 128 superimposes, overlays, or otherwise combines the viewing window with the image presented in the viewport. The input may also provide an instruction indicative of a particular image processing operation(s) to apply to the sub-region of the image in the viewing window. The image enhancer 136 processes the sub-region of the image in accordance with the instruction, and the image rendering engine 128 updates the viewing window, as well the region outside of the viewing window, as needed.

Such a viewing window can be used to selectively process the region of the image in the viewing window so as to attain desired rendering parameters for the region or a structure of interest located in the region. It is to be appreciated that this can be achieved while applying different imaging processing operations to the region of the image outside of the viewing window, if desired. As such, the structure of interest in the viewing window and the region outside of the viewing window can be concurrently displayed using different, but desired image processing operations. In one instance, respective desired processing includes processing deemed as optimal by the user or other source for viewing the region or structure of interest and the region outside of the viewing window. This may include applying image processing techniques that facilitate reducing image artifact associated with and/or enhancing the structure of interest relative to other structures in the viewing window while maintaining a desired image quality for the region of the image outside of the viewing window.

Figure 2:
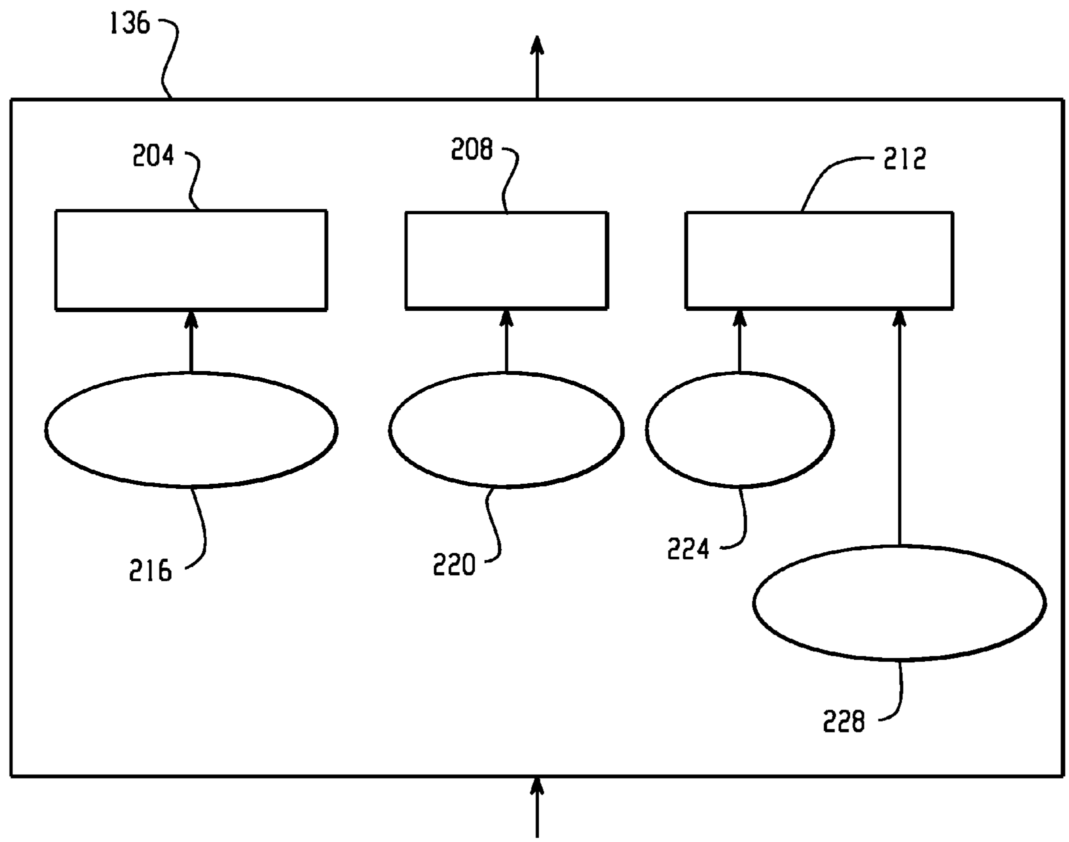
FIG. 2 illustrates an exemplary image enhancer.

As shown in FIG. 2, the image enhancer 136 includes a viewing window generator 204, a window width and level (W/L) adjustor 208, and a processor 212.

The viewing window generator 204 generates the viewing window. The shape of the viewing window can be selected by a user from one or more pre-set shapes. Suitable pre-set shapes include elliptical, circular, rectangular, and square shapes. In the illustrated embodiment, a viewing window bank 216 stores such pre-sets. The available pre-set shapes may be presented to the user in a drop down window, a menu, or other visual indicator presented via the monitor and selected therefrom using a mouse or the like. Additionally or alternatively, a keyboard/pad shortcut key or key sequence may be used to indicate the desired viewing window shape. Once a pre-set is selected by the user, the viewing window generator 204 generates a viewing window having a shape that is in accordance with the selected pre-set. The initial location of the viewing window may be a default location, selected by the user, or automatically determined based on a structure or image characteristic of interest.

Additionally or alternatively, an arbitrary shape for the viewing window can be defined by the user. For instance, the user may provide an input that indicates that the user desires to manually define the shape of the viewing window. In this instance, the user may use the mouse pointer or the like to outline or draw a perimeter of a viewing window around a structure of interest on the monitor screen. The coordinates of the perimeter are received by the viewing window generator 204, which generates a viewing window having a shape and location in accordance with the drawn perimeter.

Additionally or alternatively, the shape of the viewing window can be automatically determined by the viewing window generator 204. In this instance, the user inputs criteria such as CT number or other distinguishable characteristic in the image. The viewing window generator 204 can then employ a suitable algorithm for automatically generating and placing a viewing window within the viewport based on the CT number or other distinguishable characteristic. For example, the viewing window generator 204 may recognize certain characteristics to highlight, such as pixels within a specific window range, geometric patterns, etc. The viewing window generator 204 may alternatively use an anatomical model to facilitate locating an anatomical structure of interest such as a vessel in the viewport. The generated viewing window is mapped to the viewport based on the anatomical model.

Viewing windows are resizable so that they can be enlarged or shrunk relative to viewport, as desired. This can be achieved by a user by providing the viewing window generator 204 with a desired size or scaling factor or by re-sizing the viewing window via a mouse or the like. The perimeter of the viewing window defines a region of interest in that the region of the image bounded by the viewing window can be processed with desired image processing parameters that are different from those used to process the region outside of the viewing window so as to enhance the image quality of the region of the image in the viewing window as desired by the user.

The viewing window may also be mobile in that it can be moved from location to location within the boundaries of the viewport. Such movement can be achieved through a drag and drop or other known techniques for moving a window around on a monitor screen. The new coordinates are received by the viewing window generator 204, which generates a new viewing window or adjusts the position of the viewing window that is presented in the viewport by the image rendering engine 128. A mobile viewing window allows for dynamic on-the-fly optimization in which window local width and level values and/or other image processing techniques are automatically applied to the region in the viewing window as the viewing window moves.

The window level and width adjustor 208 is used to set and change window width and window level values that are applied to the region of the image that is located inside of the viewing window. These values are applied to this region without changing the window width and level values applied to the image that lies outside of the viewing window, if desired. However, the window level and width adjustor 208 or another component may be used to set the window values for the region of the image outside of the viewing window.

The window level and width adjustor 208 may set the window width and level values based on a user selected pre-set. A window width/level (W/L) bank 220 includes at least one pre-set having a first value for the window width and a second value for the window level in which the first and second values correspond to a particular structure of interest. For example, a pre-set may include window width and level values optimized for visualizing a stent in an anatomical vessel. A second pre-set may include window width and level values optimized for visualizing calcified plaque in an anatomical vessel. A third pre-set may include window and level values optimized for visualizing soft tissue. Other pre-sets may correspond to other structures of interest, corresponding CT numbers, and/or other display preferences.

Of course, the user may manually input values indicative of a desired window width and level. Upon receiving such values, the window level and width adjustor 208 sets the window width and level values based on the received values.

The window level and width adjustor 208 may also be invoked to automatically set the window width and level values. For instance, the window level and width adjustor 208 may receive an input indicative of a CT number or other characteristic corresponding to a desired structure. The window level and width adjustor 208 uses the received input to determine suitable or optimal window width and level values for visualizing the structure of interest based on the input. In another instance, the window level and width adjustor 208 recommends or sets window width and level values based on the region in the viewing window.

A processor 212 performs other image processing operations on the data shown in the viewing window. For instance, the processor 212 may filter or otherwise process the data presented in the viewing window. Examples of suitable filters include edge enhancement and smoothing filters, as well as other filters included in a filter bank 224. Examples of other processing may include applying an opacity/transparency setting, adaptively setting a slice thickness, optimizing image quality through special filters and histogram equalization, mapping a color to a CT number or a range of CT numbers, and applying a magnification, as well as other image processing operations included in the processing bank 228.

The processor 212 may also indicate the particular data set from which data is used to render the image for the viewing window. For instance, the user may input an instruction that indicates that a data set reconstructed with a reconstruction algorithm that is different from the reconstruction algorithm used to reconstruct the data used to generate the image in the viewport be used for the viewing window. The processor 212 notifies the image rendering engine 128, and the image rendering engine 128 updates the viewing window using the selected data set.

The viewing window generator 204, the window width and level adjustor 208, and the processor 212 are discussed separately above for explanatory purposes. However, it is to be appreciated that these components can be employed individually, together, or in some combination thereof. As such, the image enhancer 132 may concurrently generate a viewing window and apply window width and level values and/or other processing for the region in the viewing window. The particular combination can be determined through a pre-set, manually by the user, or automatically. It is to also be appreciated that the image rendering engine 128 may present two dimensional, three dimensional, or four dimensional renderings.

As noted above, the viewing window can be used to selectively apply a particular set of image processing operations to the region in the viewing window to attain a desired image quality of a structure of interest in the region. This is described in further detail next in connection with a cardiac application for visualizing a vessel lumen from a CT angiography scan of relatively smaller vessels such as the coronary arteries. It is to be understood that other applications are contemplated herein and that the cardiac application is presented for sake of explanation.

For such an application, the interior of a cardiac vessel has been shown in an image by manipulating the data so that long sections and cross sections of the vessel are displayed. These views may provide information about the extent of stenoses along the vessel. From these views, characteristics such as stenosis location, stenosis shape, and composition of plaque along a vessel have been visually observed in an image.

However, various image artifacts may occlude some of this information. For example, highly contrasted structures such as calcified plaque (calcium deposits) inside the vessel tend to bloom, depending on the window width and level values, which makes the structures appear to be larger than they actually are relative to the surrounding structure in the image. As a result, the narrowing of the vessel due to plaque may be exaggerated such that it appears to be more severe. Furthermore, the presence of a metal stent, which has a relatively high CT number, in the vessel tends to make the vessel lumen appear smaller than it actually is relative to the surrounding structure in the image.

Since the image enhancer 128 can perform various image processing operations (e.g., window width and level configuration, filtering, etc.) that are applied to the viewing window independent of those for the region outside of the viewing window, the image enhancer 128 can set the image processing operations for the region in viewing window for viewing calcified plaque and/or stents while the operations for the region outside of the viewing window can be set otherwise. For example, the window width and level, as well as any filtering or other processing, can be set for highly contrasted structures for the viewing window and lower contrasted structures for the region outside of the viewing window.

As noted above, the image processing operations may include pre-sets for viewing calcified plaque and pre-sets for viewing a stent. Using such pre-sets, calcified plaque or stent are visualized using desired or optimal parameters while the region outside of the viewing window is simultaneously visualized using a different set of image processing operations that are desired or optimal for the region of the image outside of the viewing window. For example, when viewing calcified plaque, window and filter settings that minimize the blooming artifact can be used with the viewing window, whereas the region of the image outside of the viewing window in the viewport allows the user to simultaneously view the remainder of the vessel.

Figure 3:
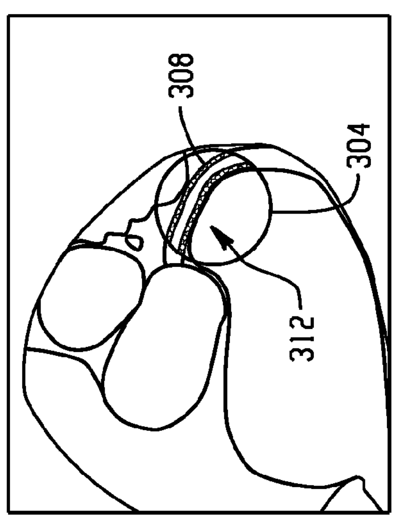
FIG. 3 illustrates a viewing window using window width and level parameters for viewing a stent.

FIG. 3 shows an image in which a viewing window 304 is placed over a vessel of interest 308. The image processing operations for the viewing window 304 are desirably configured for viewing a stent 312, which has a relatively higher CT number, in a vessel 308. In this example, the viewing window 304 is circular. Its diameter is set so that a desired portion of the vessel 308 that is visible in the image is encompassed by the viewing window 304. The viewing window 304 can be moved to view the portions of the vessel 308 that are not currently in the viewing window 304 using the desired image processing.

Figure 5:
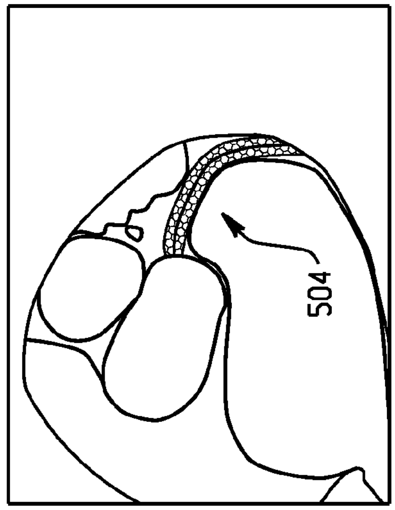
FIG. 5 illustrates an image having sub-optimal image quality with respect to a stent.
Figure 4:
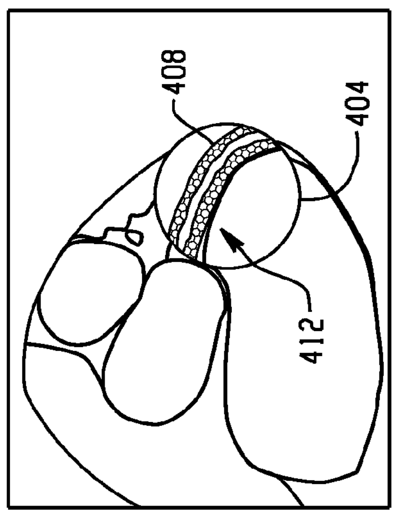
FIG. 4 illustrates a viewing window using window width and level parameters for viewing a stent and magnification.

In FIG. 4, the image processing operations for the viewing window 404 also magnify the region, including a portion of a vessel 408 and a stent 412, in a viewing window 404. For FIGS. 3 and 4, the image processing operations applied to the region outside of the viewing window is different from that used in the viewing windows. FIG. 5 shows an image in which the viewing window is omitted and a global set of image processing operations, sub-optimal for viewing the stent 312, are used for the entire visible image. Relative to the stent shown in FIGS. 3 and 4, the size and shape of the stent are exaggerated.

The viewing window may also be employed in 4D applications in which time is used as a fourth dimension. For example, a cardiac scan may be performed in which a contrast agent is introduced and the flow of the contrast agent is followed through images generated from data obtained at different moments in time. The region of these images that is bounded by the viewing window may be manually or automatically scrolled through in the viewing window. For each image, a different set of parameters may be used with the viewing window. The particular set of parameters may be selected to correspond to the state of the contrast or otherwise. For instance, an initial image may be presented in the viewing window using parameters for structures corresponding to lower CT numbers. A subsequent image in which the contrast agent is present may then be presented in the viewing window using parameters for structures having higher CT numbers. The temporal dimension may also correspond to different cardiac phases of the cardiac cycle. The structure within the viewing window such as a coronary artery, a valve, etc. may be manually or automatically scrolled in the viewing window to view the motion of that structure over a cardiac cycle. This feature also allows a region which may have suboptimal image quality due to motion to be viewed at adjacent phases to find the phase where the structure is optimally visualized, as determined either by a reduction in motion artifacts or by a better continuity with neighboring structures in the image.

Figure 6:
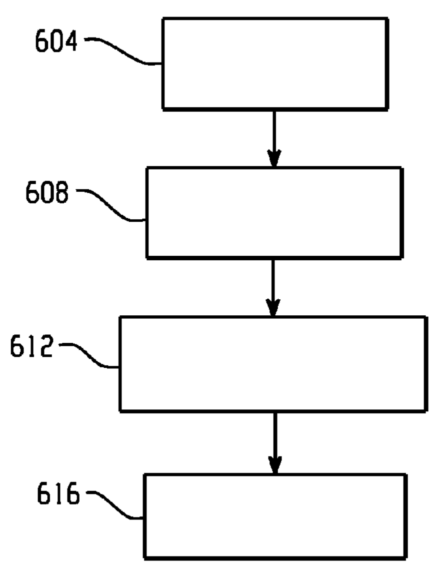
FIG. 6 illustrates a method for visualizing images.

FIG. 6 illustrates a method for using the viewing window described above.

At 604, a global image is presented in a viewport using a set of global processing operations. The set of global operations may be set to optimize the display of structures corresponding to relatively lower CT numbers.

At 608, a viewing window is generated and overlaid on the global image. As described above, the size, shape, and location of the viewing window can be set as desired.

At 612, the processing operations for the viewing window are set. As noted above, this may include setting the image processing techniques that optimize the display of structures having relatively lower CT numbers such as a stent and/or calcified plaque within a vessel.

At 616, the viewing window is optionally moved to at least a second location on the image and the image processing operations local to the viewing window are accordingly applied to the viewing window.

Applications of the forgoing and variations thereof include, but are not limited to, other imaging modalities and/or applications in which it is desirable to concurrently use at least two different sets of parameters to view different regions of an image.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A method for visualizing a region of interest within a viewport, comprising:

presenting tomographic image data as an image in a viewport using a set of global image processing operations;

presenting a viewing window in the viewport; and using, by a processor, a second, different set of image processing operations for the viewing window, wherein the second, different set of image processing operations reduces image artifact with respect to a desired structure of interest in the viewing window, wherein the second, different set of image processing operations includes a window width value and a window level value that correspond to a CT number indicative of the structure of interest, wherein the window width defines a range of CT numbers about the window level and the window level is a gray level that places the CT number indicative of the structure of interest within the window width, and wherein the window width value and the window level value of the viewing window is different from a window width value and a window level value of the viewport, wherein the viewing window is presented in the viewport at a location automatically determined based on the CT number.

2. The method of claim 1, wherein the structure of interest includes a stent located in an anatomical vessel.

3. The method of claim 1, wherein the structure of interest includes calcified plaque located in an anatomical vessel.

4. The method of claim 1, wherein the second, different set of image processing operations enhances contrast resolution of the structure of interest relative to other structures displayed in the viewing window.

5. The method of claim 1, further including moving the viewing window from a first location to a second location within the viewport, wherein the second, different set of image processing operations is applied to the region encompassed by the viewing window as the viewing window moves.

6. The method of claim 1, further including using data from a first data set to generate a region of the image that is displayed outside of the viewing window and from a second data set to generate a region of the image that is displayed inside of the viewing window, wherein the first and second data sets are reconstructed using different reconstruction algorithms.

7. The method of claim 1, further including sequentially updating the viewing window over time using data corresponding to different cardiac phases, wherein a different set of image processing operations is applied to each cardiac phase.

8. The method of claim 1, further including sequentially updating the viewing window over time using data corresponding to different cardiac phases to select a more optimal phase for a specific suboptimal region, wherein data corresponding to different phases is used for different sub-regions.

9. The method of claim 1, wherein the second, different set of image processing operations is defined in a pre-set that is selected from a plurality of pre-sets having different image processing operations.

10. The method of claim 1, wherein the second, different set of image processing operations includes a color map for mapping a color to the structure of interest in the viewing window based on a range of CT numbers corresponding to the structure of interest.

11. The method of claim 1, further including automatically generating and placing the viewing window in the viewport based the structure of interest.

12. The method of claim 1, wherein at least one of the window width does not correspond to a physical geometry of the viewing window or the viewport, or the window level does indicate a magnification level of the viewing window or the viewport.

13. The method of claim 1, further comprising dynamically applying the set of global image processing operations and the second set of image processing operations as the viewing window is moved from a first location to a second location on the image.

14. A non-transitory computer readable storage medium including instructions that, when executed by a computer, carry out the steps of:

presenting an image in a viewport using a first set of image processing operations;

overlaying a viewing portal over a sub-region of the image in the viewport; and applying a second set of image processing operations to the sub-region in the viewing portal, wherein the second set of image processing operations enhance image quality of a structure of interest viewable in the portal relative to other structures in the portal, wherein the second set of image processing operations is different from the first set of image processing operations, wherein the second set of image processing operations includes a window width value and a window level value that correspond to a CT number indicative of the structure of interest, wherein the window width defines a range of CT numbers about the window level and the window level is a gray level that places the CT number indicative of the structure of interest within the window width, and wherein the window width value and the window level value of the viewing portal is different from a window width value and a window level value of the viewport, wherein a location of the viewing portal on the image is automatically determined based on the CT number.

15. The non-transitory computer readable storage medium of claim 14, wherein the second set of image processing operations includes a pre-set windowing operation for optimally viewing a stent in a vessel.

16. The non-transitory computer readable storage medium of claim 14, wherein the second set of image processing operations includes a pre-set windowing operation for optimally viewing a calcium deposit in a vessel.

17. The non-transitory computer readable storage medium of claim 14, wherein the second set of image processing operations include an operation that reduces image artifact with respect to the structure of interest.

18. An apparatus, comprising:

an image generator that processes, by a processor, a signal indicative of radiation emitted by a radiation source that traverse an examination region signal and presents an image indicative of the examination region on a monitor; and an image enhancer that generates a viewing portal over a sub-region of the image and applies local viewing parameters to the viewing portal, wherein the local viewing parameters correspond to a structure of interest in the viewing portal wherein the local viewing parameters include a window width value and a window level value that correspond to a CT number indicative of the structure of interest, wherein the window width value and the window level value of the viewing portal is different from a window width value and a window level value of the image, and the window width defines a range of CT numbers about the window level and the window level is a gray level that places the CT number indicative of the structure of interest within the window width, wherein a location of the viewing portal on the image is automatically determined based on the CT number.

19. The apparatus of claim 18, furthering including a portal generator that uses pre-set geometrical shapes to create the portal.

20. The apparatus of claim 19, wherein the pre-set geometrical shape is selected from a drop-down menu on the monitor, wherein the pre-set geometrical shape is at least one of a circle, a square, and an ellipse.

21. The apparatus of claim 18, wherein the image enhancer dynamically applies the local viewing parameters as the viewing portal is moved from a first location to a second location on the image.

22. The apparatus of claim 18, wherein the image generator and the image enhancer process data reconstructed with different reconstruction algorithms.

23. The apparatus of claim 18, wherein the image enhancer automatically sets the window width value and window level value based on the sub-region of the image in the viewing portal.

24. The apparatus of claim 18, wherein the image enhancer automatically configures the local viewing parameters based on the sub-region of the image in the viewing portal.

25. The apparatus of claim 18, wherein the image generator updates the viewing portal over time using data corresponding to different cardiac phases.

26. The apparatus of claim 25, wherein a different set of image processing operations are automatically applied for each of the cardiac phases.

* * * * *